(12) United States Patent
Okamoto (10) Patent No.: US 6,587,760 B2
(45) Date of Patent: Jul. 1, 2003

(54) MOTOR VEHICLE PARKING SUPPORT UNIT AND METHOD THEREOF

(75) Inventor: Shinichi Okamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/235,816

(22) Filed: Sep. 6, 2002

(65) Prior Publication Data

US 2003/0045973 A1 Mar. 6, 2003

(30) Foreign Application Priority Data

Sep. 6, 2001 (JP) .................................. 2001-270254

(51) Int. Cl.$^7$ ................................................ G06F 7/00
(52) U.S. Cl. ............................... 701/1; 701/36; 701/41; 340/932.2
(58) Field of Search ................................ 701/1, 23, 41, 701/36, 42, 300, 301, 97, 101; 340/932.2, 435, 903; 180/204, 401, 404, 405, 407

(56) References Cited

U.S. PATENT DOCUMENTS

| | | | | |
|---|---|---|---|---|
| 5,646,614 A | * | 7/1997 | Abersfelder et al. | ..... 340/932.2 |
| 5,670,935 A | * | 9/1997 | Schofield et al. | ........... 340/435 |
| 5,742,141 A | * | 4/1998 | Czekaj | .......................... 701/1 |
| 6,186,259 B1 | * | 2/2001 | Shimizu et al. | ............... 701/42 |
| 6,476,730 B2 | * | 11/2002 | Kakinami et al. | ....... 340/932.2 |

FOREIGN PATENT DOCUMENTS

JP          2000-79860          3/2000

* cited by examiner

Primary Examiner—Richard M. Camby
(74) Attorney, Agent, or Firm—Armstrong, Westerman & Hattori, LLP (57) ABSTRACT

The method includes the steps of picking up a rear area image FI behind a motor vehicle, displaying the rear area image FI, sensing a steering angle of the vehicle, and sensing a position of the vehicle. A vehicle image VI is superposed on a desired parking position P of the vehicle in the rear area image FI, and a predicted vehicle route image TR1 is generated within the predetermined area based on a steering angle and an initial position of the vehicle, while an actual vehicle route image TR2 is generated based on actual steering angles and positions of the vehicle. The vehicle image V1, the predicted vehicle route image TR1, and the actual vehicle route image TR2 are superposed on the rear area image FI. The method further has a step for obtaining a difference between the predicted vehicle route image TR1 and the actual vehicle route image TR2 and another step for noticing a steering angle correction message based on the difference.

10 Claims, 6 Drawing Sheets

FIG. 6

# MOTOR VEHICLE PARKING SUPPORT UNIT AND METHOD THEREOF

BACKGROUND OF THE INVENTION

1. Field of the Invention

The present invention relates to a parking support unit and a parking support method for assisting a steering operation of a motor vehicle during parallel parking, garaging, etc. of the vehicle.

2. Related Art

A conventional one of such units is disclosed in Japanese Patent Application Laid-open No. 2000-79860. This unit displays a predicted vehicle route determined based on a steering angle during parking on a display screen positioned near a driver's seat. In connection with the predicted vehicle route, a window for finding white guide lines of a parking bay is prepared on the screen.

The window is moved on the screen for finding positions and orientations of the white lines to determine a geometrical arrangement of the parking bay. The unit provides a phonic advice of vehicle steering for a driver in consideration of the parking operation.

The conventional unit requires a complicated image processing for finding the white lines of the parking bay based on image information obtained by a camera. Thus, the unit needs a CPU having a higher process speed, disadvantageously increasing the cost of the unit.

Furthermore, the unit cannot be useful to guide the vehicle when there are no white lines in a parking bay and in a space between other stopped vehicles on a road, limiting the usage of the unit.

SUMMARY OF THE INVENTION

In view of the foregoing disadvantage of the conventional unit, an object of the invention is to provide a parking support unit and a parking support method for assisting a steering operation of a motor vehicle to correctly guide the vehicle into a parking bay. The vehicle can be moved backward according to a predicted vehicle route indicated on a display screen during a parking operation of the vehicle.

Figure 1:
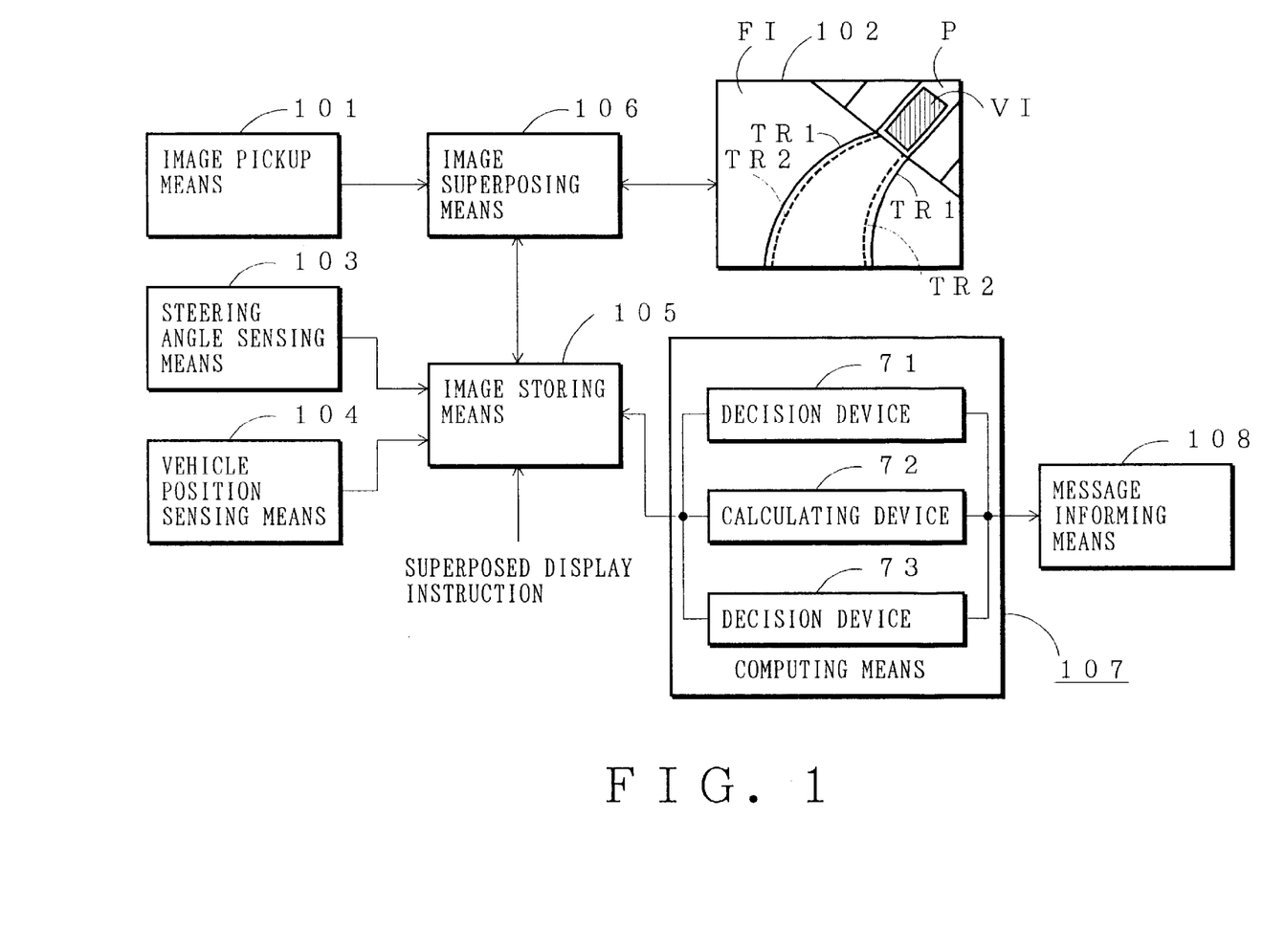
FIG. 1 is a basic block diagram of a parking support unit according to the present invention.

A parking support unit according to the present invention, as illustrated in a basic block diagram of FIG. 1, includes:

an image pickup means 101 for picking up an image FI of a rear area behind a motor vehicle, the rear area located at a predetermined position relative to the vehicle, a display means 102 for displaying the rear area image FI, a steering angle sensing means 103, a vehicle position sensing means 104, an image storing means 105 for storing a vehicle image VI, a predicted vehicle route image TR1, and an actual vehicle route image TR2 of the vehicle, and an image superposing means 106, wherein the vehicle image VI is superposed on a desired parking position P of the vehicle in the rear area image FI indicated by the display means 102, and the predicted vehicle route image TR1 is generated within the predetermined area based on a steering angle and an initial position of the vehicle, while the actual vehicle route image TR2 is generated based on actual steering angles and positions of the vehicle, the image superposing means 106 indicating the vehicle image V1, the predicted vehicle route image TR1, and the actual vehicle route image TR2 by the display means 102 to superpose them on the rear area image FI.

Thus, the predicted vehicle route image TR1 showing a predicted vehicle route from the present stopped position to a desired parking position is superposed on the rear area image FI indicated on the screen. Furthermore, the actual vehicle route image TR2 is generated based on actual steering angles and positions of the vehicle while the vehicle moves backward from the present stopped position to the desired parking position, and the actual vehicle route image TR2 is superposed on the predicted vehicle route image TR1. A difference between the predicted vehicle route image TR1 and the actual vehicle route image TR2 is used for an appropriate operation correction of a steering wheel by a driver. Accordingly, the driver can move backward the vehicle even to a parking space having no guide lines for parking the vehicle.

The unit, an illustrated in FIG. 1, further has a computing means 107 for obtaining a difference between the predicted vehicle route image TR1 and the actual vehicle route image TR2 and a message informing means 108 for informing a steering angle correction message based on the difference.

Thus, the driver can advantageously know a deviation of the vehicle from a predicted vehicle route image TR1 at an earlier stage of the parking operation, so that the driver can correct the deviation to park the vehicle with ease.

Preferably, the computing means 107 has a decision device 73 for determining a steering direction and a steering amount based on the difference between the predicted vehicle route image TR1 and the actual vehicle route image TR2 to correct the difference. The decision is noticed by the message informing means 108.

Preferably, the computing means 107 has a decision device 71 for determining whether the vehicle can be moved backward to a desired parking position from the present position of the vehicle within a maximum steering angle of the vehicle. The decision is noticed by a voice of the message informing means 108. This allows the driver not to repeat a parking operation toward a parking bay Preferably, the computing means 107 has a calculating device 72 for calculating a preliminary forwarding distance which is necessary for the vehicle to be moved to a desired parking position from the present position of the vehicle within a maximum steering angle of the vehicle. The result is noticed by a voice of the message informing means 108. Thus, when it is determined that the vehicle can not be moved backward to a desired parking position, the message informing means 108 gives a preliminary forwarding distance of the vehicle to enable the parking at the desired parking position. Thus, the driver can know a correct start point for moving backward the vehicle with ease, enabling an efficient parking operation of the vehicle.

A parking support method according to the present invention includes the steps of:

picking up an image FI of a rear area behind a motor vehicle, the rear area located at a predetermined position relative to the vehicle, displaying the rear area image FI, sensing a steering angle of the vehicle, sensing a position of the vehicle, storing a vehicle image V1, a predicted vehicle route image TR1, and an actual vehicle route image TR2 of the vehicle, and indicating the vehicle image V1, the predicted vehicle route image TR1, and the actual vehicle route image TR2, wherein the vehicle image VI is superposed on a desired parking position P of the vehicle in the rear area image FI, and the predicted vehicle route image TR1 is generated within the predetermined area based on a steering angle and an initial position of the vehicle, while the actual vehicle route image TR2 is generated based on actual steering angles and positions of the vehicle, the indicating step indicating the vehicle image V1, the predicted vehicle route image TR1, and the actual vehicle route image TR2 to superpose them on the rear area image FI.

Thus, the predicted vehicle route image TR1 showing a predicted vehicle route from the present stopped position to a desired parking position is superposed on the rear area image FI indicated on the screen. Furthermore, the actual vehicle route image TR2 is generated based on actual steering angles and positions of the vehicle while the vehicle moves backward from the present stopped position to the desired parking position, and the actual vehicle route image TR2 is superposed on the predicted vehicle route image TR1. A difference between the predicted vehicle route image TR1 and the actual vehicle route image TR2 is used for an appropriate correction of a steering wheel operation by a driver.

The method further has a step for obtaining a difference between the predicted vehicle route image TR1 and the actual vehicle route image TR2 and another step for informing a steering angle correction message based on the difference. Thus, the method can output a steering wheel turning direction based on the deference between the predicted vehicle route image TR1 and the actual vehicle route image TR2.

Preferably, the method further has a step for determining a steering direction and a steering amount based on the difference between the predicted vehicle route image TR1 and the actual vehicle route image TR2 to correct the difference. The decision is noticed by the message informing means 108.

Preferably, the method further has a step for determining whether the vehicle can be moved backward to a desired parking position from the present position of the vehicle within a maximum steering angle of the vehicle. The decision is noticed by the message informing means 108.

Preferably, the method has a step for calculating a preliminary forwarding distance which is necessary for the vehicle to be moved to a desired parking position from the present position of the vehicle within a maximum steering angle of the vehicle. The result is noticed by a voice of the message informing means 108. Thus, when it is determined that the vehicle can not be moved backward to a desired parking position, the message informing means 108 informs the preliminary forwarding distance of the vehicle by a voice to enable the parking at the desired parking position.

DETAILED DESCRIPTION OF THE PREFERRED EMBODIMENTS

Figure 2:
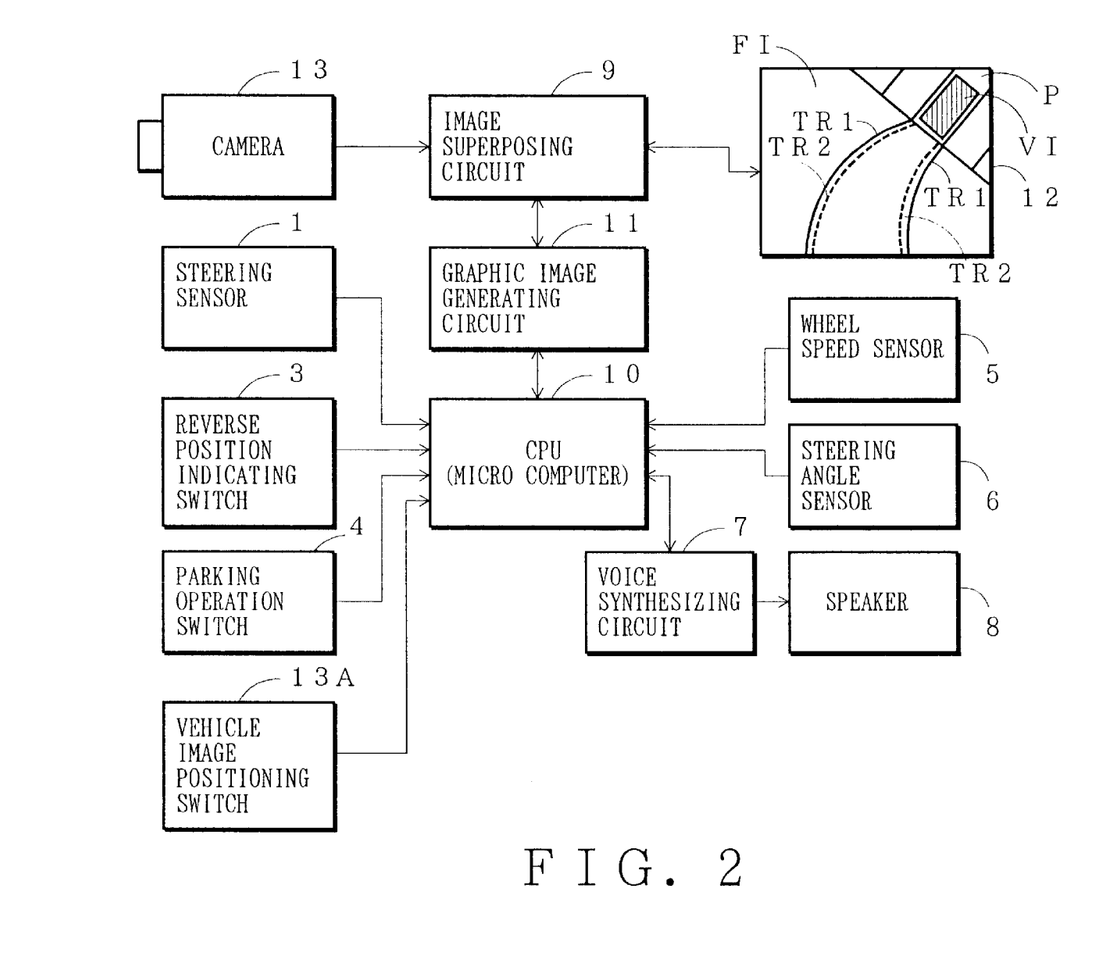
FIG. 2 is a block diagram of a parking support unit of an embodiment according to the present invention.

Referring to the accompanied drawings, a parking support unit of an embodiment according to the present invention will be discussed hereafter. FIG. 2 shows a parking support unit of the embodiment. The unit has a CCD camera 13 for taking a picture of a rear area of a vehicle (not shown), a steering sensor 1 for sensing an angle of a steering wheel of the vehicle, a reverse position indicating switch 3 for indicating a reverse state of transmission shift lever (not shown), a parking operation switch 4 for showing to perform a parking support operation (including a superposed displaying process) at the parking of the vehicle, a vehicle image positioning switch 13A for moving a vehicle image to a desired parking position in a rear area image indicated on a display discussed later, a wheel speed sensor 5 for sensing a speed of each of left and right follower wheels, a steering angle sensor 6 for sensing a steering angle, a display 12, and a voice synthesizing circuit 7. On the rear area taken by the CCD camera 13, the display 12 superposes a vehicle image VI which shows a desired parking position P of the vehicle. Furthermore, The display 12 superposes a predicted vehicle route image TR1 generated within the predetermined area based on a steering angle and an initial position of the vehicle and an actual vehicle route image TR2 generated based on actual steering angles and positions of the vehicle, when the vehicle moves backward toward the desired parking position P. The voice synthesizing circuit 7 serves to output synthesized voices via a speaker 8 to give a parking aiding message.

The unit has a CPU 10 for controlling the whole unit, a graphic image generating circuit 11, and an image superposing circuit 9. The graphic image generating circuit 11 provides graphics which illustrate the predicted vehicle route image TR1 generated based on outputs from the sensors 5, 6 and the switches, the actual vehicle route image TR2, and the vehicle image VI. The image superposing circuit 9 superposes graphic signals provided from the graphic image generating circuit 11 on image signals of a rear area image taken by the CCD camera 13. Thus, the image superposing circuit 9 superposes the vehicle image VI, the predicted vehicle route image TR1, and the actual vehicle route image TR2 to display them on the screen of the display 12.

CPU 10 has a memory (image storing means 105) for storing data of the predicted vehicle route image TR1, the actual vehicle route image TR2, and the vehicle image VI. The predicted vehicle route image TR1 and the actual vehicle route image TR2, which are generated based on outputs of the wheel speed sensor 5 and the steering angle sensor 6, are red out from the memory to be displayed on the display 12.

The CCD camera 13 for taking a picture of a rear area is mounted at a middle of a rear face above a number plate of the vehicle so as to orient diagonally downward. More specifically, the camera is directed backward at a 30° downward angle and has a wide angle lens allowing a 140° view. The camera can take a view extending 8 meters backward.

The display 12 is arranged on a panel of a center console positioned in a cabin of the vehicle. In the console, there is provided a controller consisting of the image superposing circuit 9, the graphic image generating circuit 11, and the voice synthesizing circuit 7 above a glove box. Near the console, there may be arranged the parking operation switch 4 indicating the parking support operation and the vehicle image positioning switch 13A for moving the vehicle image VI to the desired parking position P on the display 12.

A general configuration of the present invention will be discussed before referring to a parking support unit of an embodiment of the invention.

In the present invention, the display 12 mounted in the vehicle displays there a rare a for moving backward the vehicle from a road to a desired parking position P in a parking area. On an image of the rear area, the vehicle image VI at the desired parking area P is displayed in graphic image.

Next, it is determined whether the vehicle can reach the desired parking position P from the present position. When the decision is affirmative, the display 12 displays a graphic image of a predicted vehicle route image TR1 along which the vehicle moves from the present position to the desired parking position P with a steering angle.

Furthermore, present positions of the vehicle are determined based on outputs of the steering sensor and the wheel speed sensor. This can generate an actual vehicle route image TR2 along which the vehicle moves from the initial position to the desired parking position P. The actual vehicle route image TR2 is superposed on the predicted vehicle route image TR1 on the display 12.

When the actual vehicle route image TR2 is deviated from the predicted vehicle route image TR1, a phonic warning is given to a driver of the vehicle or the driver can see the deviation on the display 12. Thereby, the driver operates a steering wheel to coincide the actual vehicle route image TR2 with the predicted vehicle route image TR1. Accordingly, the driver requires a minimum wheel operation to move backward the vehicle to the desired parking position P.

Figure 3:
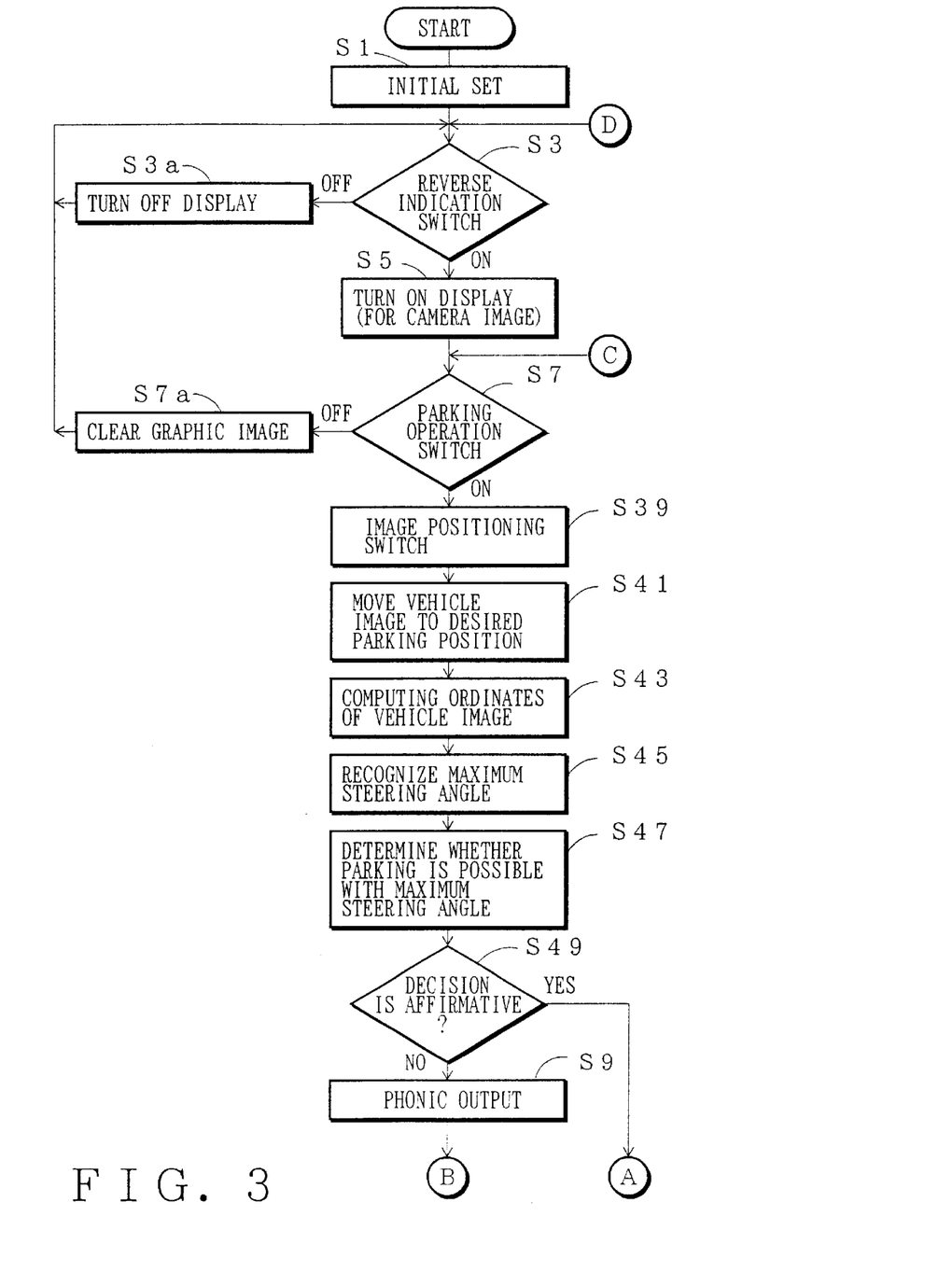
FIG. 3 is a flowchart showing operations of the parking support unit of the embodiment.
Figure 4:
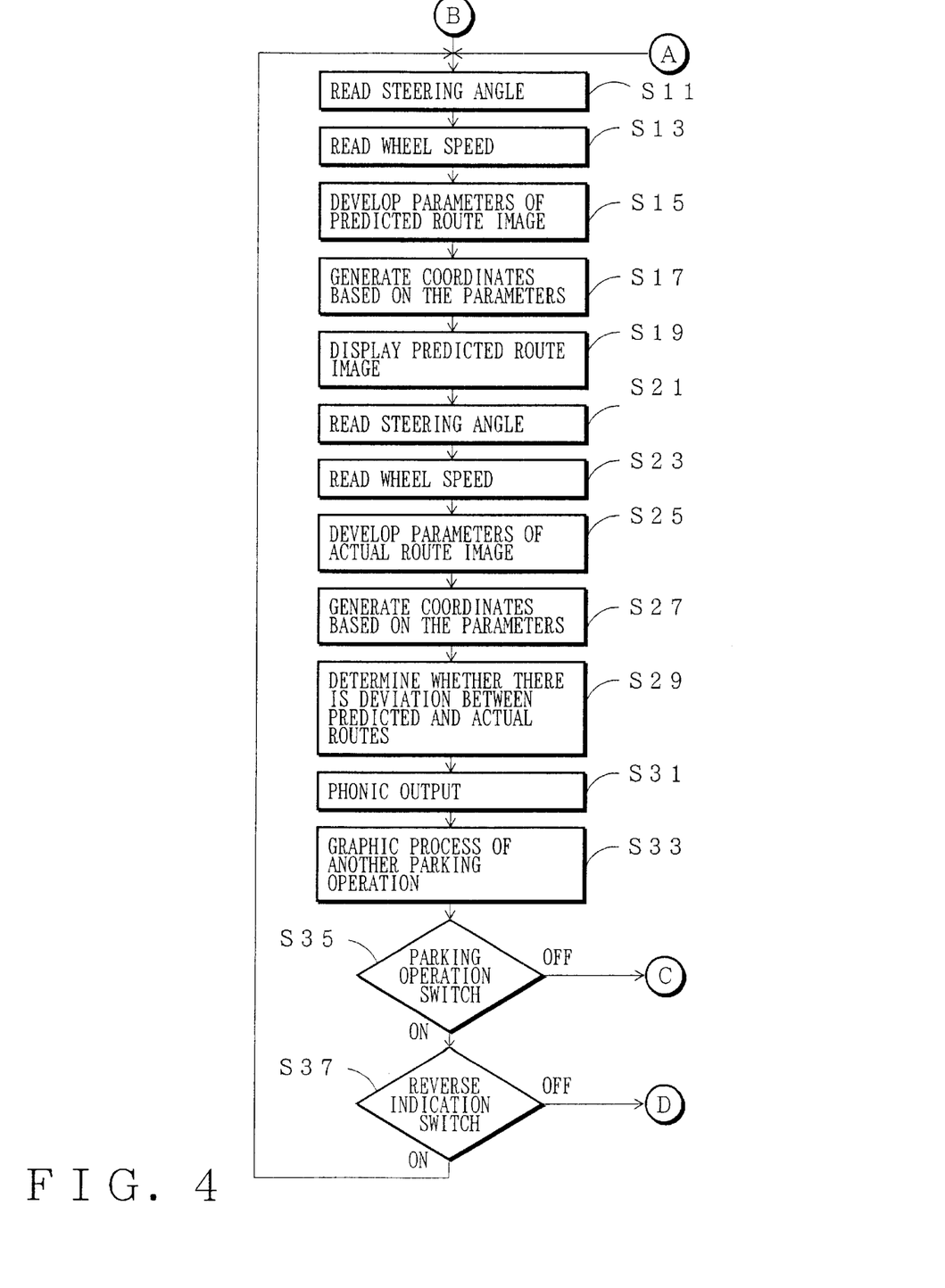
FIG. 4 is also a flowchart showing operations of the parking support unit of the embodiment.

Next, referring to flowcharts shown in FIGS. 3 and 4, the embodiment will be discussed in detail.

The controller starts processing when a power source switch is turned on. Step Si sets various initial values necessary for desired processes. Then, step S3 checks a state of the reverse position Indicating switch 3. When the switch 3 does not indicate a reverse lever state, step S3a stops a related indication and the execution returns to step 3.

On the other hand, when the reverse position indicating switch 3 is turned on (in a reverse lever state), the execution goes to step S5. Step S5 changes the display 12 in a camera image displaying mode so that the rear area image FI is indicated on the display. That is, the display 12 shows a correct rear view to recognize persons standing therein, goods lying thereon, etc.

Next, step S7 checks the parking operation switch 4 for showing whether the vehicle will be parked or not. When the parking operation switch 4 is off, step S7a clears a related graphic image on the display 12 and shows only a rear area image FI. Then the execution returns to step S3.

In step S7, when the parking operation switch 4 is on, the desired parking area P is confirmed in a rear area image FI. Then, step S39 moves the vehicle image positioning switch 13A upward, downward, left, or right, so that step S41 moves a vehicle image VI to the desired parking position P.

Next, step S43 develops ordinates of the vehicle image VI, e.g. relative to the present position of the vehicle. Step S45 recognizes a maximum steering angle of a steering wheel and the execution goes to step S47. Step S47 determines whether the vehicle can be moved backward from the present position to the desired parking position P with the maximum steering angle.

For example, the parking possibility is determined by whether the vehicle route of the vehicle with the maximum steering angle crosses a vehicle route of the vehicle image VI positioned at the desired parking position P.

Note that the steering angle is not only set at the maximum angle but a more practical steering angle may be selected.

Step S49 determines whether the vehicle can be moved backward to the desired parking position P within the maximum steering angle. When the decision is negative, step S9 gives phonic information indicating the negative state to the driver by a speaker 8 via the voice synthesizing circuit 7. Then, a forwarding distance of the vehicle is obtained to enable the vehicle to be moved backward to the desired parking position P with an appropriate steering angle.

Figure 5A:
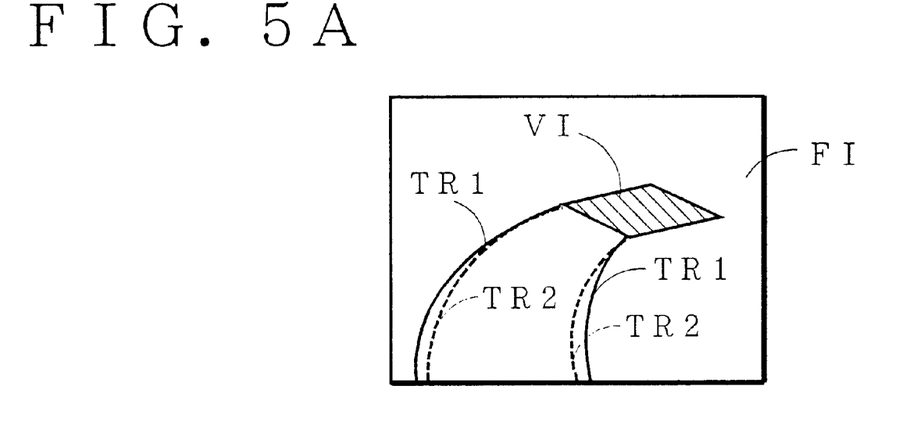
FIGS. 5A, 5B, and 5C are illustrations showing vehicle routes during a parking operation of the vehicle.

On the contrary, when the vehicle will be able to be moved backward to the desired parking position P within the maximum steering angle, a predicted vehicle route image TR1 corresponding to a present steering angle is superposed on a rear area image FI on the screen of the display 12 (see FIG. 5A). The driver can move backward the vehicle such that the vehicle image VI traces the predicted vehicle route image TR1.

The rear area image FI moves on the screen with the movement of the vehicle. However, the vehicle image VI located at the desired parking position P keeps the predetermined position within the rear area image FI.

It may be possible that phonic messages are given to the driver to assist the parking operation at an initial stage of the operation. For example, the messages are predetermined such as "please move your vehicle backward along a predicted vehicle route image TR1 displayed on a screen with being careful about surroundings" or "please start a parking operation and please turn a steering wheel such that a leading end of a predicted vehicle route image TR1 (e.g. colored green) directs to a parking bay".

For knowing a deviation of the actual vehicle route image TR2 from the predicted vehicle route image TR1, an envelop of the predicted vehicle route image TR1 is preliminary provided. For the purpose, step S11 receives a steering angle from the steering sensor 1 to obtain a turning radius R for the parking operation. Furthermore, step S13 receives signals from the wheel speed sensor 5 to obtain a present position of the vehicle.

Based on the signals from the sensors, step S15 develops parameters defining a predicted vehicle route image TR1. Then, step S17 generates coordinates based on the parameters of the predicted vehicle route image TR1.

Figure 6:
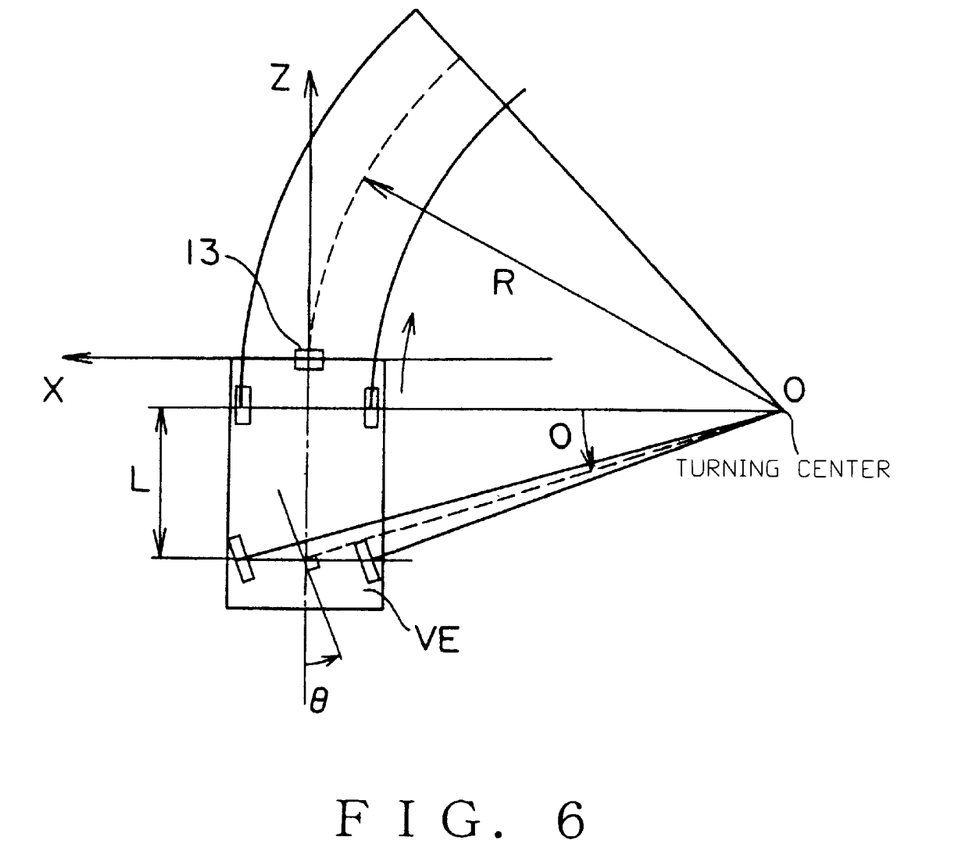
FIG. 6 is an illustration showing a turning operation of the vehicle which is moved backward with a steering angle.

As illustrated in FIG. 6, the parameters of the predicted vehicle route image TR1 are obtained from the turning radius R which is determined from a steering angle $\theta$ and a wheel base L. The predicted vehicle route image TR1 may have a width of 2.0 m to 2.2 m in a radial direction of the turning radius R while the parking bay has a width of about 2.2 m to 2.4 m.

Next, as illustrated in FIG. 5A, step S19 superposes an actual vehicle route image TR2 on the predicted vehicle route image TR1.

For obtaining a latest one of the actual vehicle route image TR2, step S21 receives signals from steering sensor 1, and step S23 receives signals from the wheel speed sensor 5. Based on the signals, step S25 develops parameters of the actual vehicle route image TR2. These parameters show positions relative to a center of a camera mounted on the vehicle.

Step S27 develops coordinates of the actual vehicle route image TR2. The coordinates of the actual vehicle route image TR2 are defined relative to a turning center ○ shown in FIG. 6 as well as the coordinates of the predicted vehicle route image TR1.

Figure 5B:
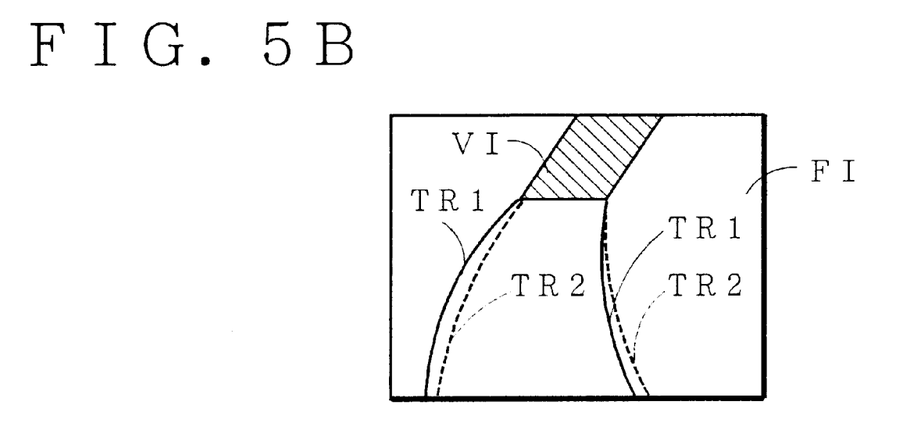

Thus obtained coordinates of the predicted vehicle route image TR1 and the actual vehicle route image actual vehicle route image TR2 are updated according to signals from the steering sensor 1 and the wheel speed sensor 5. Step S29 determines whether the actual vehicle route image TR2 traces the predicted vehicle route image TR1 based on a deviation value between the coordinates of the predicted vehicle route image TR1 and the actual vehicle route image TR2. When the actual vehicle route image TR2 is not within the predicted vehicle route image TR1 as illustrated in FIG. 5B, step S31 gives a phonic message such as "please turn the steering wheel a little rightward".

When the actual vehicle route image TR2 is much deviated from the predicted vehicle route image TR1, step 33 carries out again a graphic process in which another predicted vehicle route image TR1 is superposed on a rear area image FI in the display screen to try another parking operation.

When the trial is successful so that the actual vehicle route image TR2 is within the predicted vehicle route image TR1, the parking is possible with a present steering angle. In that case, the speaker outputs a phonic message such as "please move the vehicle backward with a present steering angle and please be careful for surroundings".

Next, step S35 determines whether the parking operation switch 4 is on or not. When the parking operation switch 4 is not on, the execution returns to step S7.

On the contrary, when the parking operation switch 4 is on, step S37 checks whether the reverse position indicating switch 3 is in a reverse state. When the switch is not in a reverse state, the execution returns to step S3. When the switch is in a reverse state, processes of steps 1 to 35 are repeated.

Accordingly, when the shift lever is in a reverse state and a parking support is requested, a predicted vehicle route image TR1 is superposed on a rear area image FI in the display screen. A driver can turn the steering wheel based on an image of the display 12 to move the vehicle backward appropriately.

Figure 5C:
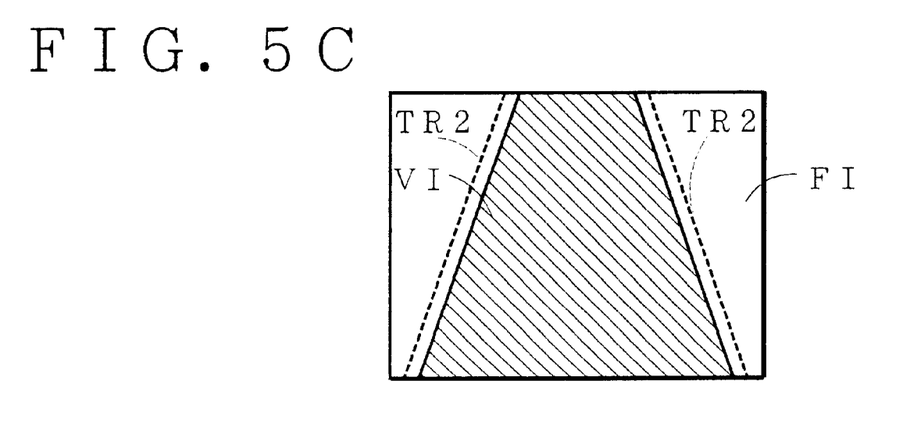

As illustrated in FIG. 5C, when the vehicle has correctly moved into the parking bay, the steering wheel is returned in a straight forward position and the vehicle is further moved backward to reach an end of the parking bay. This operation can be safely carried out with watching a rearward view.

What is claimed is:

1. A parking support unit comprising:
    a means for picking up an image of a rear area behind a motor vehicle, the rear area located at a predetermined position relative to the vehicle,
    a means for displaying the rear area image,
    a means for sensing a steering angle of the vehicle,
    a means for sensing a position of the vehicle,
    an image storing means for storing a vehicle image, a predicted vehicle route image, and an actual vehicle route image of the vehicle, and
    an image superposing means,
    wherein the vehicle image is superposed on a desired parking position of the vehicle in the rear area image indicated by the display means, and the predicted vehicle route image is generated at the predetermined position based on a steering angle and an initial position of the vehicle, while the actual vehicle route image is generated based on actual steering angles and positions of the vehicle, the image superposing means indicating the vehicle image, the predicted vehicle route image, and the actual vehicle route image by the display means to superpose them on the rear area image.

2. The unit set forth in claim 1 further comprising a computing means for obtaining a difference between the predicted vehicle route image and the actual vehicle route image and a message informing means for informing a steering angle correction message to a driver of the vehicle based on the difference.

3. The unit set forth in claim 2, wherein the computing means has a decision device for determining a steering direction and a steering amount based on the difference between the predicted vehicle route image and the actual vehicle route image to correct the difference, and the decision is noticed by the message informing means.

4. The unit set forth in claim 3, wherein the computing means has another decision device for determining whether the vehicle can be moved backward to a desired parking position from a present position of the vehicle with in a maximum steering angle of the vehicle, and the decision is noticed by a voice of the message informing means.

5. The unit set forth in claim 4, wherein the computing means has a calculating device for calculating a preliminary forwarding distance which is necessary for the vehicle to be moved to a desired parking position from the present position of the vehicle within a maximum steering angle of the vehicle, and the result is noticed by a voice of the message informing means.

6. A parking support method comprising the steps of:
    picking up an image of a rear area behind a motor vehicle, the rear area located at a predetermined position relative to the vehicle,
    displaying the rear area image,
    sensing a steering angle of the vehicle,
    sensing a position of the vehicle,
    storing a vehicle image, a predicted vehicle route image, and an actual vehicle route image of the vehicle, and indicating the vehicle image, the predicted vehicle route image, and the actual vehicle route image,
    wherein the vehicle image is superposed on a desired parking position of the vehicle in the rear area image, and the predicted vehicle route image is generated within the predetermined area based on a steering angle and an initial position of the vehicle, while the actual vehicle route image is generated based on actual steering angles and positions of the vehicle, the indicating step indicating the vehicle image, the predicted vehicle route image, and the actual vehicle route image to superpose them on the rear area image.

7. The method set forth in claim 6 further comprising a step for obtaining a difference between the predicted vehicle route image and the actual vehicle route image and another step for informing a steering angle correction message based on the difference.

8. The method set forth in claim 7 further comprising a step for determining a steering direction and a steering amount based on the difference between the predicted vehicle route image and the actual vehicle route image to correct the difference, and the decision is noticed by a message informing means.

9. The method set forth in claim 8 further comprising a step for determining whether the vehicle can be moved backward to a desired parking position from the present position of the vehicle within a maximum steering angle of the vehicle, and the decision is noticed by the message informing means.

10. The method set forth in claim 9 further comprising a step for calculating a preliminary forwarding distance which is necessary for the vehicle to be moved to a desired parking position from the present position of the vehicle within a maximum steering angle of the vehicle, and the result is noticed by the message informing means.

* * * * *